Figure 1:
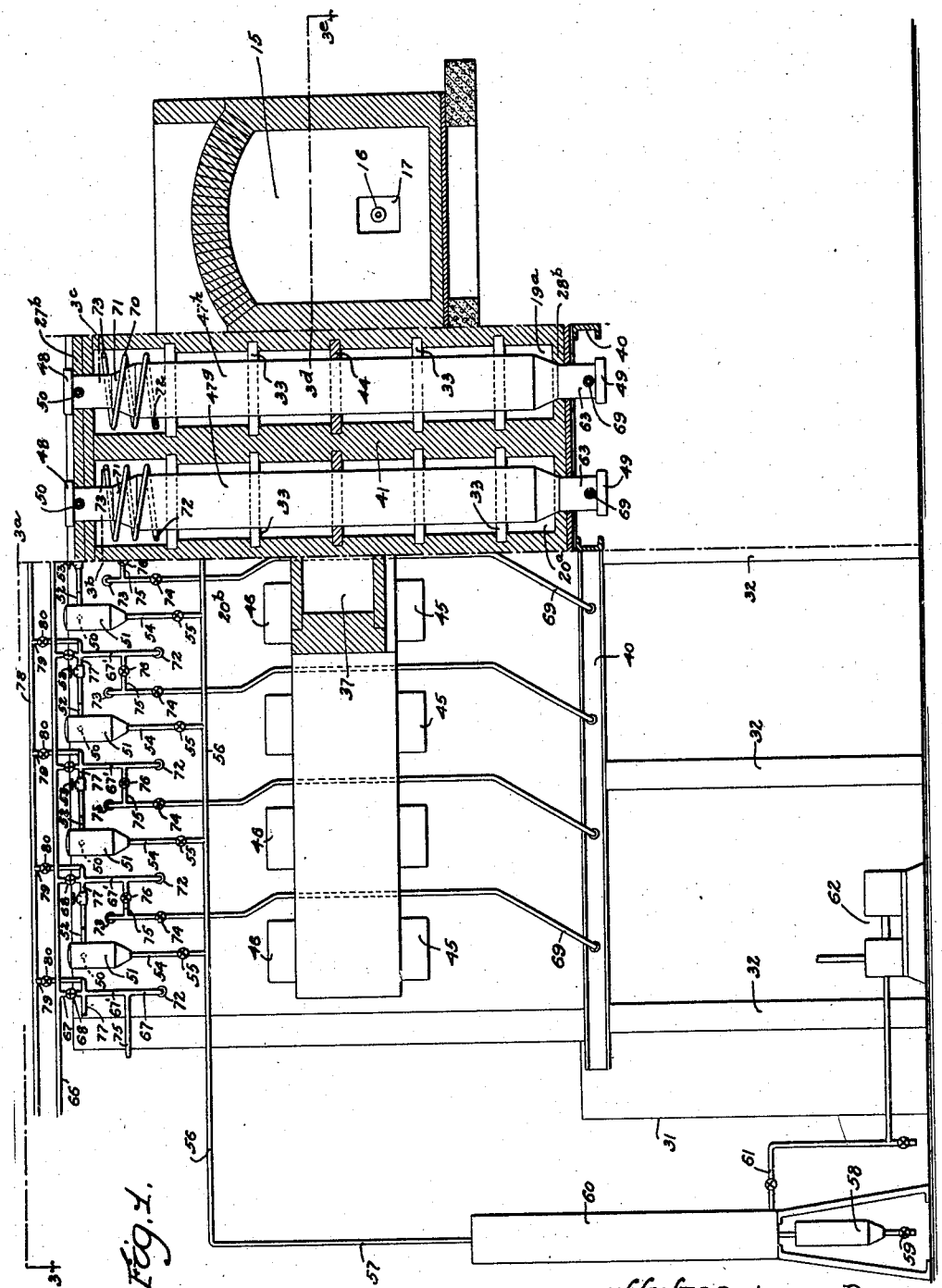

Jan. 28, 1930. L. DAAMS 1,744,827
MERCURY EXTRACTING APPARATUS
Filed May 25, 1927 3 Sheets-Sheet 2

INVENTOR - LUCAS DAAMS
By
ATTORNEY

Jan. 28, 1930. L. DAAMS 1,744,827
MERCURY EXTRACTING APPARATUS
Filed May 25, 1927 3 Sheets-Sheet 3

INVENTOR — Lucas Daams
ATTORNEY

Patented Jan. 28, 1930

1,744,827

UNITED STATES PATENT OFFICE

LUCAS DAAMS, OF ALHAMBRA, CALIFORNIA

MERCURY-EXTRACTING APPARATUS

Application filed May 25, 1927. Serial No. 194,071.

As may be inferred from the above title, this invention relates more particularly to means and methods for the extraction of mercury from a sulfid ore such as cinnabar; but the principles of this invention, involving the use of steam, or its equivalent, and preferably employing a plurality of closed retorts which are provided with external heating means and adapted to be consecutively charged and discharged in rotation, are believed to be applicable also in the treatment of analogous ores.

In known processes, the cinnabar has sometimes been permitted to come into direct contact with the products of combustion, the mercury vapors being carried off therewith, under conditions which necessitate the employment of unduly large cooling and condensing apparatus, and the recovered mercury has often been badly contaminated with soot. In the direct contact apparatus referred to, large amounts of mercury are, moreover, sometimes lost in brickwork or permitted to escape through cracks therein. It is an object of my invention to obviate such contamination; and to avoid the losses referred to, employing highly efficient apparatus, moderate in cost, and economical also by reason of its durability and efficiency.

As compared with certain other forms of mercury recovery apparatus, in which moving parts are subjected to great wear (with incidental production of dust) it is an object of my invention to minimize or obviate use of relatively moving parts; and I also aim to confine the evolved vapors to a closed circuit in a manner which is economical of heat, and which substantially avoids losses by absorption or by escape of vapors through cracks,—with incidental waste and danger of mercury poisoning.

It is a further object of my invention to provide a series of highly inclined or substantially vertical retorts with means for heating the same by flame and flue gases, said gases preferably advancing in opposite directions toward an outlet at an intermediate level. Said outlet may be provided with oppositely disposed dampers and connected with a common and centrally disposed flue in which a steam generator or boiler may be provided; and, in preferred embodiments of my invention, steam from said boiler, or another suitable entrainment fluid or mixture, may be superheated near any one or more of said retorts and thereafter advanced, at an elevated temperature, into the same retort or into another retort; and an outlet pipe (preferably provided near the top of each retort) may be alternatively connectible either with a condenser or with a pipe leading (preferably by way of another superheating coil) into an adjacent retort,—said retorts being so connected that a vapor mixture from any retort in a finishing stage or phase may be advanced through the additional retorts or the entire series of retorts in the order in which said retorts may have been charged, only the latest-charged retort being, at any given moment, connected with the mentioned condenser.

Figure 2:
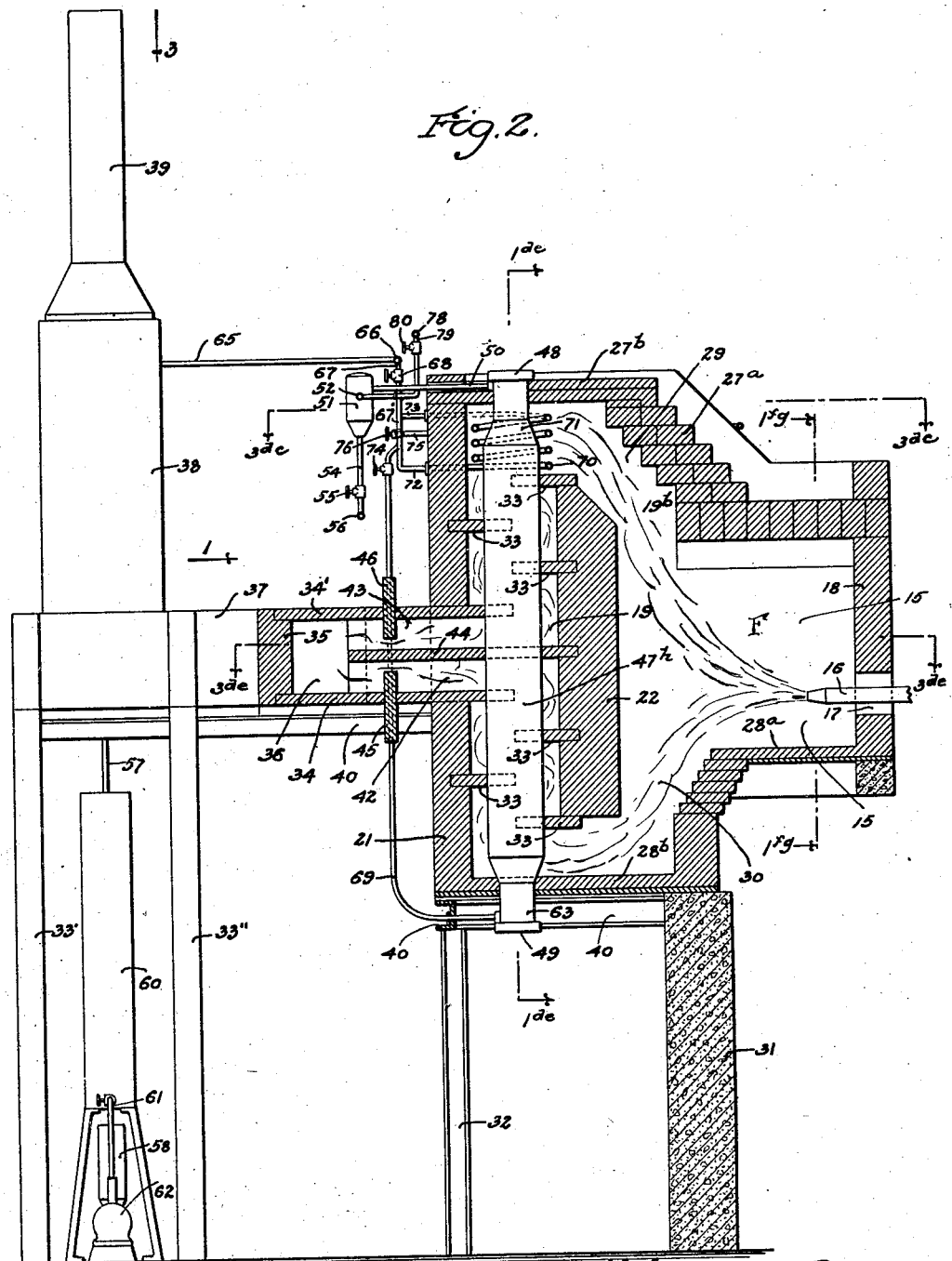
Figure 3:
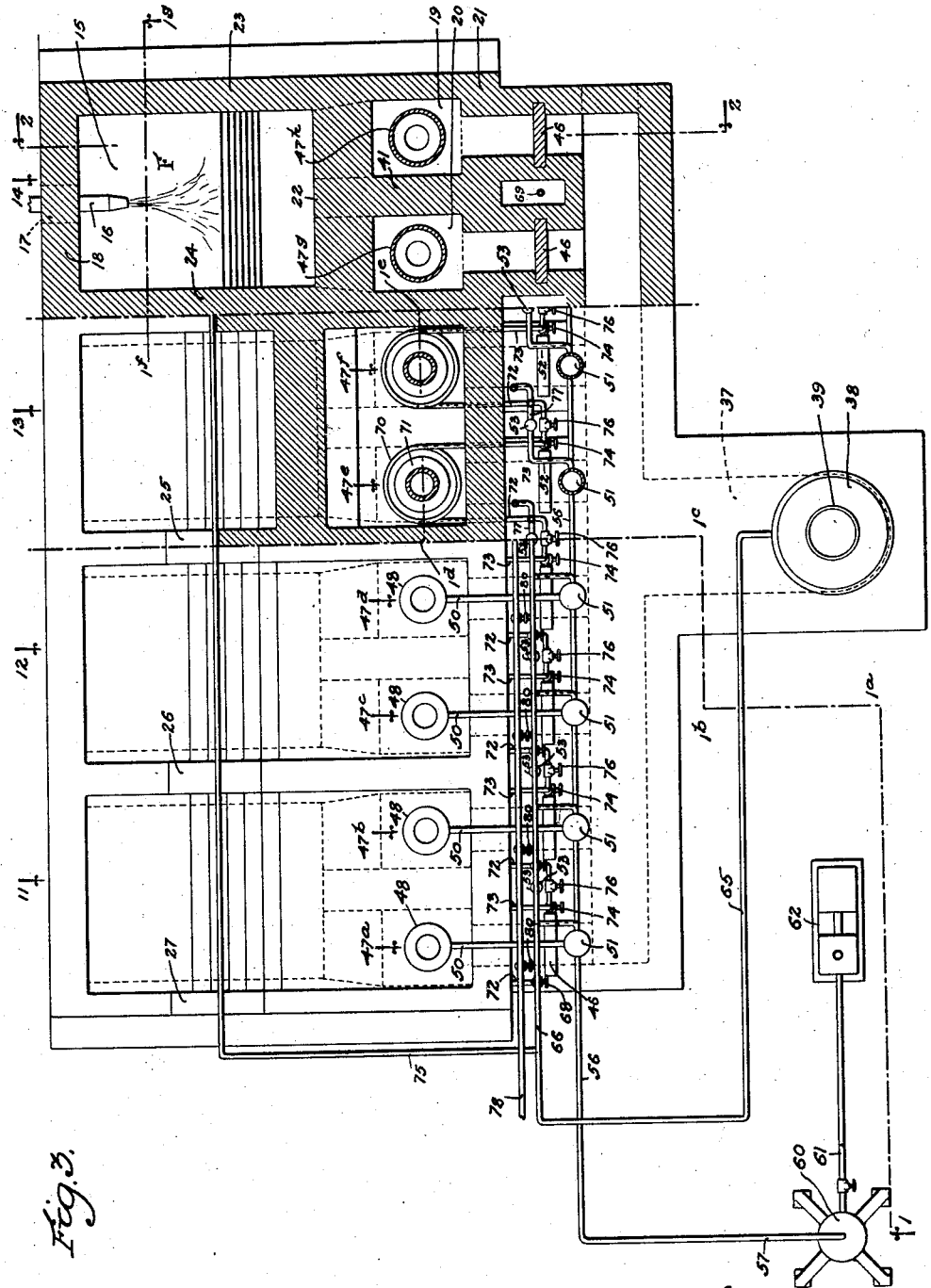

Other objects of my invention, in which I may make use of not only superheated steam but external flames and/or oxidizing or reducing gases,—the steam being heated to a maximum temperature such as 1200° F. and used not only for a heating effect but to sweep evolved vapors from each retort in turn, may be best appreciated from the following description of an illustrative embodiment of said invention, taken in connection with the appended claims and the accompanying drawings, in which Fig. 1 is, for the most part, a front elevational view; but with parts eliminated or shown in vertical section,—substantially as indicated by the broken line 1—1$^g$ (comprising line segments 1$^a$—1$^b$, 1$^b$—1$^c$, 1$^c$—1$^d$, 1$^d$—1$^e$, 1$^e$—1$^f$, 1$^f$—1$^g$) of Fig. 3 and by arrow 1 and lines 1$^{de}$—1$^{de}$ and 1$^{fg}$—1$^{fg}$ of Fig. 2.

Fig. 2 is a vertical section, taken substantially as indicated by the line 2—2 of Fig. 3, with parts shown in elevation.

Fig. 3 is, for the most part, a top plan view, but with parts shown in horizontal section,— substantially as indicated by the broken line 3—3$^e$ (comprising line segments 3—3$^a$, 3$^a$—3$^b$, 3$^b$—3$^c$, 3$^c$—3$^d$ and 3$^d$—3$^e$) of Fig. 1, and by arrow 3 and lines 3$^{dc}$—3$^{dc}$ and 3$^{de}$—3$^{de}$ of Fig. 2.

Referring to the details of that specific embodiment of my invention chosen for purposes of illustration, I show at 11, 12, 13 and 14 a series of furnaces or furnace compartments, each comprising a flame or combustion chamber 15 (into which a burner or burners 16 may project, by way of any suitable opening 17 in a rear furnace wall 18) and a pair of retort chambers 19, 20. The mentioned retort chambers are defined in part by a front wall 21 and in part by an intermediate, flame-receiving partial partition or retort-protecting wall 22.

The walls 18, 21 and 22, and additional vertical walls 23—27 (in the case of an eight-retort installation) as well as an inclined or stepped ceiling comprising parts 27$^a$ and 27$^b$ and an inclined or stepped floor comprising parts 28$^a$ and 28$^b$ (said ceiling and floor being preferably so shaped as to provide divergent or spaced flame passages or throats 29 and 30) may be supported by any suitable means,—such as foundation walls 31 and/or metallic frame elements 32; and the retort chambers 19, 20, may be provided with wall-inserted baffles 33,—shown as staggered suitably to a maximum heating effect from flames of flue gases advancing in opposite directions from the throats 29 and 30. The frame elements 32 co-operate with additional frame elements 33' and 33'' in supporting the walls 34, 34' and 35 of a substantially horizontal flue gas passage 36,—shown as communicating, by a central conduit 37, with the interior of a steam generator or heat conserving boiler 38. The latter is shown as provided with a stack 39; and any desired additional horizontal or other frame elements or reinforcing elements 40 may be employed,—their strength and distribution depending upon the magnitude of the installation and being comparatively immaterial to my present invention.

Vertical partitions 41 being preferably interposed between retort chambers 19 and 20, each chamber may be provided with a plurality of separate outlets 42, 43; and each pair of outlets may be separated by a horizontal or other plate or partition 44,—the construction here referred to being preferably such that said outlets may be provided with separate dampers 45, 46 (equipped with any suitable adjusting means, not shown).

Within the mentioned retort chambers I show a set of substantially vertical retorts 47$^a$, 47$^b$, 47$^c$, 47$^d$, 47$^e$, 47$^f$, 47$^g$, 47$^h$,—each retort being provided with a tight but removable inlet closure 48, and with a tight but removable outlet closure 49, additional to a vapor outlet pipe 50; and each vapor outlet pipe may be connected with a collecting pot or condensate trap 51. Each pot or trap 51 is shown as provided with an elevated "gas" outlet 52, valved at 53, and also with a bottom outlet 54, valved at 55. The outlet pipes 54 are preferably connected with a common "header" 56,—shown as continuous with a pipe 57, leading to a mercury receptacle or other receiver 58. The latter is shown as provided with a draw-off valve 59; and, to permit of a cyclical and practically continuous mode of operation hereinafter described, interposing a condenser 60 in the pipe 57, I may connect therewith, by means such as a valved pipe 61, an evacuating pump 62, or equivalent means for producing a predetermined pressure.

A constricted lower portion 63 of each retort is shown as projecting through the lower floor section 28$^b$; and by similarly disposing a constricted upper portion of each retort relatively to a ceiling section 27$^b$, I facilitate the charging and discharging of my retorts,—with or without the aid of special handling machinery, not shown; and, instead of relying exclusively upon external heating means such as may be provided by upper and lower branches of a flame F projected from the burner 16, or its equivalent, toward partition 22, optionally so securing baffle plates 33 as incidentally to provide lateral support for my retorts, I may employ any suitable means for introducing thereto steam, or the like, from a source such as boiler 38; and I may provide any suitable means for preheating such steam, or its equivalent, and/or for introducing an additional and reactive fluid.

For example, providing the boiler 38 with a steam delivery pipe 65, leading to a steam header 66, I may connect this header (as by branches comprising pipes 67, 67', in which I show valves 68) with inlet pipes 69 leading respectively into the constricted lower portions 63 of the respective retorts; and, in order to superheat the steam and/or other fluid so introduced, I may render each branch pipe 67' continuous with the pipe 69, interposing therebetween or therein heating coils 70. Said coils are shown as surrounding an upper constricted portion 71 of each retort.

The character 72 being applied to what I may term an "inlet" or "cooler" end of each coil, and the character 73 being applied to each hotter or outlet end thereof, I show each pipe 69 as valved at 74; and I also suggest the provision of separate by-passes 75, valved at 76, to permit a "shunting" of superheated steam or the like, from the outlet end of one coil 70 to the inlet end of an adjacent coil; but greater interest and importance may attach to my provision, in connection with the so-called "gas" outlets 52 from my pots 51, of not only a circulating connection 77, to permit the establishment of communication between the outlet from any pot or trap and the inlet to an adjacent retort (as, by way of its branch pipe 67' connected with a coil 70) and to my provision of means (such as an auxiliary main 78, having branches 79) permitting the introduction of air or hydrogen or oxygen, or any desired mixture of reagent fluids into the steam inlet branches 67', or the like.

Although desired effects might obviously be obtained by the use of a single furnace or furnace section (whether provided with one retort or with a plurality of retorts of the general character described) I consider it advantageous to adapt a set of retorts to be successively charged and discharged. Thus, introducing each new quantity of steam, or the like, into a retort during a finishing phase of a treatment of ore therein, I prefer to advance such steam, or its equivalent, successively through subsequently charged retorts,—the steam being finally permitted to exit past one of the valves 55 into the header 56, carrying therewith the mercury or other condensate from the corresponding pot or trap 51.

Although I show my retorts as disposed in a linear series, it will be obvious that, so far as concerns the principles of my invention, they might be disposed either at uniform or non-uniform distances from a central steam boiler 38, or its equivalent,—the retort $47^a$ being functionally "adjacent" to the retort $47^h$, and one of the mentioned retorts being presumably always in a finishing phase during an initial heating phase of one adjacent retort. For example (momentarily disregarding the brief time interval that may be required for charging and discharging) assuming the retort $47^f$ to have reached its finishing phase, a quantity of steam (preferably with air, oxygen, hydrogen, or another reagent gas or mixture) may be admitted thereto, for a final wash-out effect, through its inlet pipe 69; and this quantity of steam, with any added or entrained material, may be advanced, by way of its outlet pipe 50, through the associated trap or pot 51, dropping its mercury, or the like (if not all previously delivered thereto) in said pot; and, assuming the valve 53 in the so-called gas outlet pipe 52 to be open, said steam may be advanced, by way of that connection 77 and that steam inlet pipe 67' which are connected with the coil 70 of the adjacent retort $47^g$,—into which said steam may enter, after being suitably reheated in the last-mentioned coil. This quantity of steam (with or without additions provided by opening valves 68 additional to that by which steam may be supplied to the retort $47^f$) may be carried, in like manner, through the entire series of retorts until finally delivered into the header 56 by an opening of that valve 55 which may control the delivery of mercury, or the like, from the pot 50 of the retort $47^e$ last previously charged.

The retort $47^f$ being thereafter dumped and recharged, and the retort $47^g$ being ready for a finishing treatment, the same steps may be repeated, in connection therewith,—the outlet below the pot 50 of retort $47^e$ being then closed and the outlet below the pot of retort $47^d$ being open; and each retort may thus in turn pass through a succession of phases corresponding in number to the total number of retorts,—all but one of the pots 51 being, in the case assumed, used in the collection of mercury throughout seven phases, and each pot being emptied, in turn.

It will be understood that my use of steam contributes not only to a conservation of heat but to an entrainment or wash-out effect; and I may superheat the introduced steam up to a temperature of about 1200° F. At about this temperature, the disassociation of the steam may slightly contribute to its effectiveness; but I consider it advantageous to introduce therewith a more active fluid reagent, such as ordinary air or oxygen or hydrogen. A moderate addition of air, oxygen or hydrogen is favorable not only to operation at a lower temperature than that mentioned, but to an avoidance of a mere sublimation effect upon cinnabar, or the like, and to an accelerated rate of reaction; but, in case hydrogen is employed, due regard must be given not only to enhanced fire risks but to the appreciable corrosive action of $H_2S$, as compared with that of the $SO_2$ resulting from oxidation of the sulphur of the cinnabar. In case $H_2S$ is produced, danger of corrosion may, however, be overcome by the use of a suitable material, (such as so-called "calorite") in the construction of metallic parts exposed thereto.

Although I have herein described a single complete embodiment of my invention, mentioning more particularly the use of my apparatus and method in connection with the recovery of mercury from cinnabar, it should be understood not only that various features of my invention might be independently employed, and that numerous modifications additional to those herein suggested, might readily be devised by workers in the arts to which this case relates, but also that my novel apparatus and methods are believed capable of use in the reduction of various oxid or sulfid ores of other metals—those of zinc, for example,—as by enclosing the exposed pipes and connections in a suitable insulating material or by providing other means to assure fluidity of the reduced metal up to the time of its delivery from the collecting receptacle 58, or its equivalent.

I claim as my invention:

1. In an apparatus for the recovery of a reduced metal from an ore: a furnace comprising a combustion chamber communicating with a retort chamber by a lower discharge passage and by an upper discharge passage; and means for varying the flow of heat through said passages.

2. In an apparatus for the recovery of a reduced metal from an ore: a furnace comprising a combustion chamber communicating with a retort chamber by a lower passage and by an upper passage; and means for varying the flow of heat through said passage, said last mentioned means comprising outlets, one above another, provided with separate dampers.

3. In an apparatus for the recovery of a reduced metal from an ore: a furnace comprising a combustion chamber communicating with a retort chamber by a lower passage and by an upper passage; and means for varying the flow of heat through said passages,—said last-mentioned means comprising outlets, one above another, provided with separate dampers, and said retort chamber being provided with a substantially vertical retort.

4. In an apparatus for the recovery of a reduced metal from an ore: a furnace comprising a combustion chamber communicating with a retort chamber by a lower passage and by an upper passage; and means for varying the flow of heat through said passages,—said last-mentioned means comprising outlets, one above another, provided with separate dampers, and said retort chamber being provided with a substantially vertical retort, and said retort being provided with means for the admission and exit of an entrainment fluid.

5. In an apparatus for the recovery of a reduced metal from an ore: a furnace comprising a combustion chamber communicating with a retort chamber by a lower passage and by an upper passage; and means for varying the flow of heat through said passages,—said last-mentioned means comprising outlets, one above another, provided with separate dampers, said retort chamber being provided with a substantially vertical retort, and said retort being surrounded by a superheating coil and said coil being provided with means controlling the advance of an entrainment fluid therethrough.

6. In an apparatus for the recovery of a reduced metal from an ore: a furnace comprising a combustion chamber communicating with retort chambers by separate passages; means for varying the flow of heat through said passages; and substantially vertical retorts in said retort chambers,—a plurality of like furnaces being associated in a series and the retorts thereof being provided with separate outlet pipes, each of said pipes having a condensate trap therein, and means for conducting gas from the outlet of one of said traps to the inlet of one of said retorts.

7. In an apparatus for the recovery of a reduced metal from an ore: a furnace comprising a combustion chamber communicating with a retort chamber by a lower passage and by an upper passage; means for varying the flow of heat through said passages, a substantially vertical retort in said chamber—said retort being provided with an outlet pipe, a condensate trap in said outlet pipe, and said trap being provided with a separately valved "gas" outlet.

8. In an apparatus for the recovery of a reduced metal from an ore: a furnace comprising a combustion chamber communicating with a retort chamber,—a plurality of like furnaces being associated in a series; and retorts positioned therein and provided with separate traps or pots in outlet pipes therefrom, each of said pots being provided with a separately valved "gas" outlet and with a separately valved bottom outlet, and means for rendering each of the said gas outlets communicative with the inlet of one of the said retorts.

9. An apparatus for the recovery of a reduced metal from an ore embodying: a furnace; retorts therein provided with outlet and inlet connections adapting said retorts to be selectively connected in series; means for passing a reagent fluid through said retorts; and pumping means for producing a predetermined pressure within said retorts.

10. An apparatus for the recovery of a reduced metal from an ore embodying: a furnace; retorts therein provided with outlet and inlet connections adapting said retorts to be selectively connected in series; means for introducing an entrainment fluid into said retorts; and means for admixing a reagent fluid with said entrainment fluid and passing the resultant admixture through a selective series of said retorts.

In testimony whereof, I have hereunto set my hand at Los Angeles, California, this 7th day of May, 1927.

LUCAS DAAMS.